H. Hammond.
Die for Forming Slots in Screws.
Nº 73,888.     Patented Jan. 28, 1868

Witnesses             Inventor
Henry A Cooley      Henry Hammond
Theo G Ellis

UNITED STATES PATENT OFFICE.

HENRY HAMMOND, OF HARTFORD, CONNECTICUT.

IMPROVEMENT IN DIES FOR FORMING SLOTS IN SCREWS.

Specification forming part of Letters Patent No. 73,888, dated January 28, 1868.

*To all whom it may concern:*

Be it known that I, HENRY HAMMOND, of Hartford, in the county of Hartford and State of Connecticut, have invented a new and Improved Method of Forming Slots in the Heads of Screws by Means of Dies; and I do hereby declare the following to be a full, clear, and exact description thereof, reference being had to the accompanying drawings, and to the letters of reference marked thereon.

Figure 3:
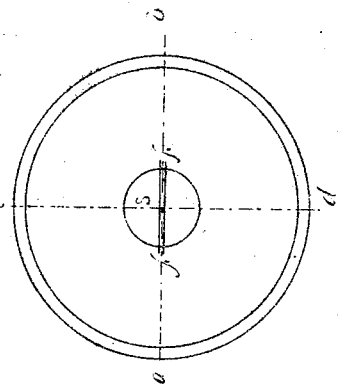
Figure 2:
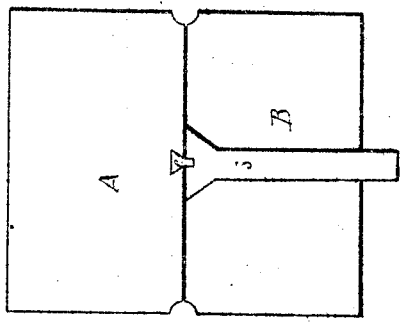
Figure 1:
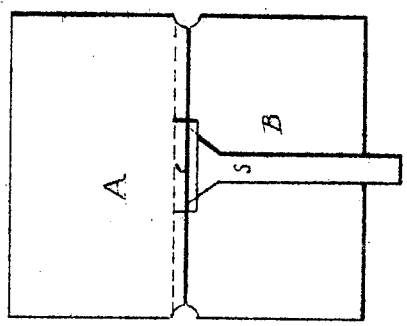

Figure 1 is a vertical section of the dies on the line $a\ b$, Fig. 3. Fig. 2 is a vertical section of the dies on the line $c\ d$, Fig. 3, at right angles to that shown in Fig. 1. Fig. 3 is a horizontal plan of the bottom die and head of the screw S.

Like letters in the several figures indicate like parts.

A is top, and B the bottom, die. S is the screw or blank being operated upon. $e$ is a lip, forming a part of, or attached to, the upper die A, which enters the head of the screw and gives the desired form to the slot. $f\ f$ is a slot in the bottom die, into which the ends of the lip $e$ fit.

My invention consists in giving any desired form and a uniform gage to the slots in screw-heads by means of dies or swages, in which the screw is placed and subjected to pressure.

The dies are so constructed that the screw drops into the lower one, and rests in a socket which supports the under side of the head, leaving the top of the head a little above the surface of the die. The top die is made to fit the bottom one, except over the screw-head, where it is furnished with a lip, $e$, to form the slot or nick in the screw. The part of this lip which extends outside of the slot in the screw fits into a slot in the bottom die. The lip $e$ forms and determines the size of the slot when the metal of the screw-head is pressed against it, leaving the slot of the exact form of the lip $e$. This lip may be made of any desired form. In the drawings it is shown of a dovetailed form, making a dovetailed slot in the screw. It may be made rectangular, so as to form a plain square slot, or of any other form.

The operation of slotting is performed as follows: The screw or screw-blank, having been previously nicked with a plain slot by any ordinary method, is placed in the dies, and pressure applied sufficient to force the metal of the screw-head against the lip $e$, which determines the form and gage of the slot. The dies are then separated, and the screw removed by any common mechanical appliance.

What I claim as my invention, and desire to secure by Letters Patent, is—

1. The combination of the devies $A\ e\ B\ f$, when constructed and arranged to be used in conjunction, substantially as specified.

2. The combination of the devices $A\ e\ B$, constructed and operating substantially as herein set forth.

HENRY HAMMOND.

Witnesses:
HENRY A. COOLEY,
THEO. G. ELLIS.